(No Model.) 3 Sheets—Sheet 1.

F. A. HUNTINGTON.
VEHICLE.

No. 411,196. Patented Sept. 17, 1889.

Witnesses
Geo. H. Strong.
J. H. Nurse

Inventor,
F. A. Huntington.
By Dewey & Co.
Attys (No Model.) 3 Sheets—Sheet 2.

F. A. HUNTINGTON.
VEHICLE.

No. 411,196. Patented Sept. 17, 1889.

Witnesses,
Geo. H. Strong.
J. H. Nourse

Inventor,
F. A. Huntington
By Dewey & Co.
Attys (No Model.)  3 Sheets—Sheet 3.
F. A. HUNTINGTON.
VEHICLE.
No. 411,196. Patented Sept. 17, 1889.
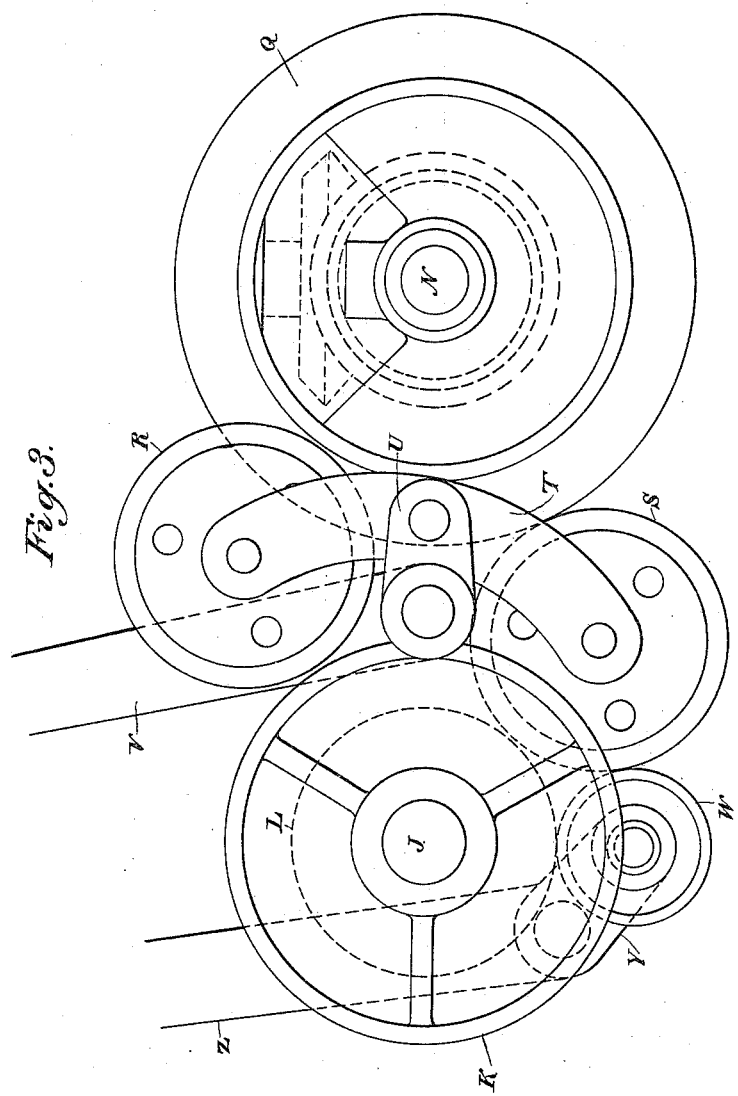
Witnesses,
Geo. H. Strong.
Inventor,
F. A. Huntington
By Dewey & Co.
Attys

UNITED STATES PATENT OFFICE.

FRANK A. HUNTINGTON, OF SAN FRANCISCO, CALIFORNIA.

VEHICLE.

SPECIFICATION forming part of Letters Patent No. 411,196, dated September 17, 1889.

Application filed January 11, 1889. Serial No. 296,103. (No model.)

*To all whom it may concern:*

Be it known that I, FRANK A. HUNTINGTON, of the city and county of San Francisco, State of California, have invented an Improvement in Vehicles; and I hereby declare the following to be a full, clear, and exact description of the same.

My invention relates to certain improvements in vehicles; and it consists of an engine and suitable intermediate gearing whereby the vehicle may be propelled, as will be more fully explained by reference to the accompanying drawings, in which—

Figure 1:
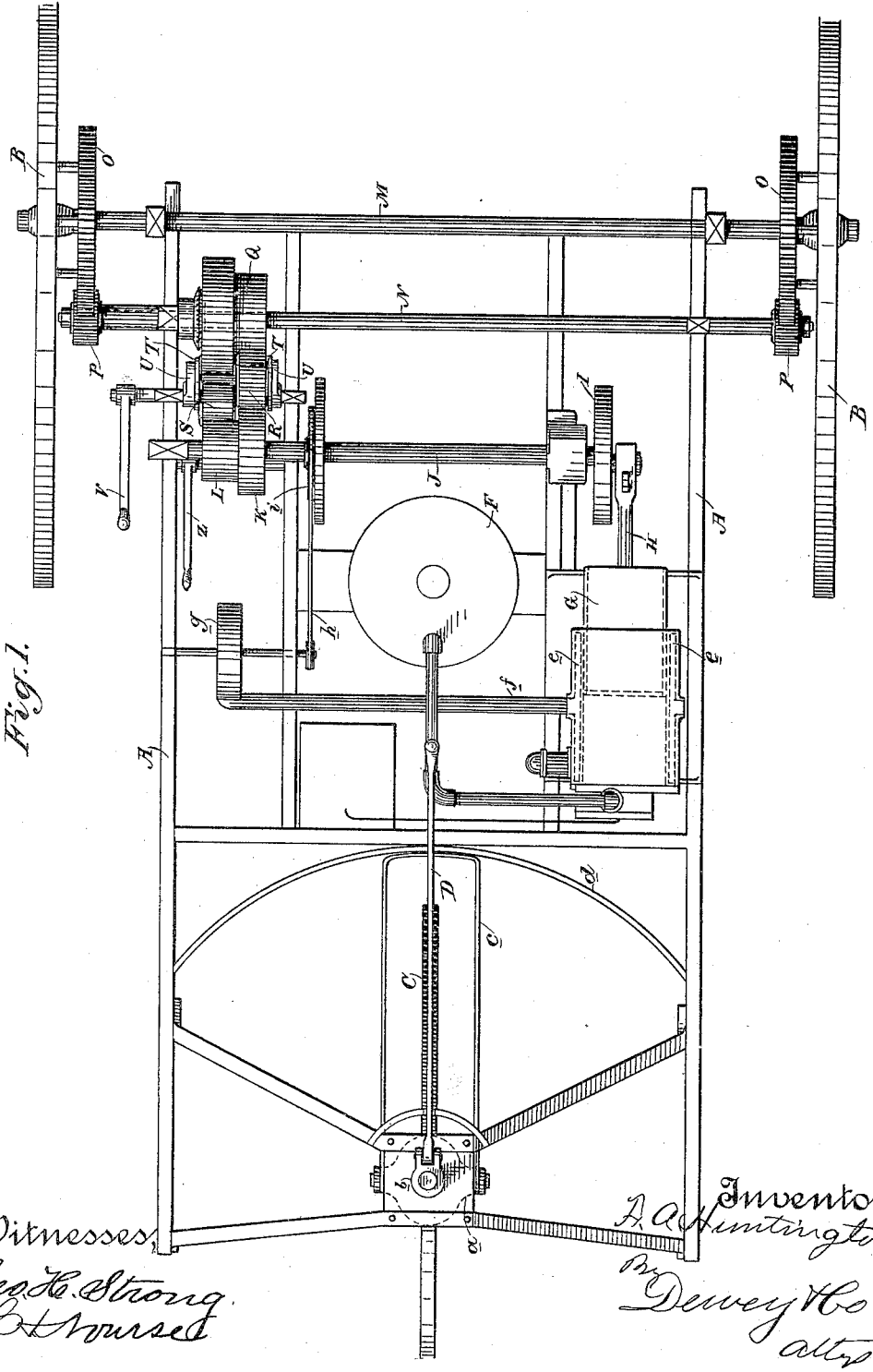
Figure 2:
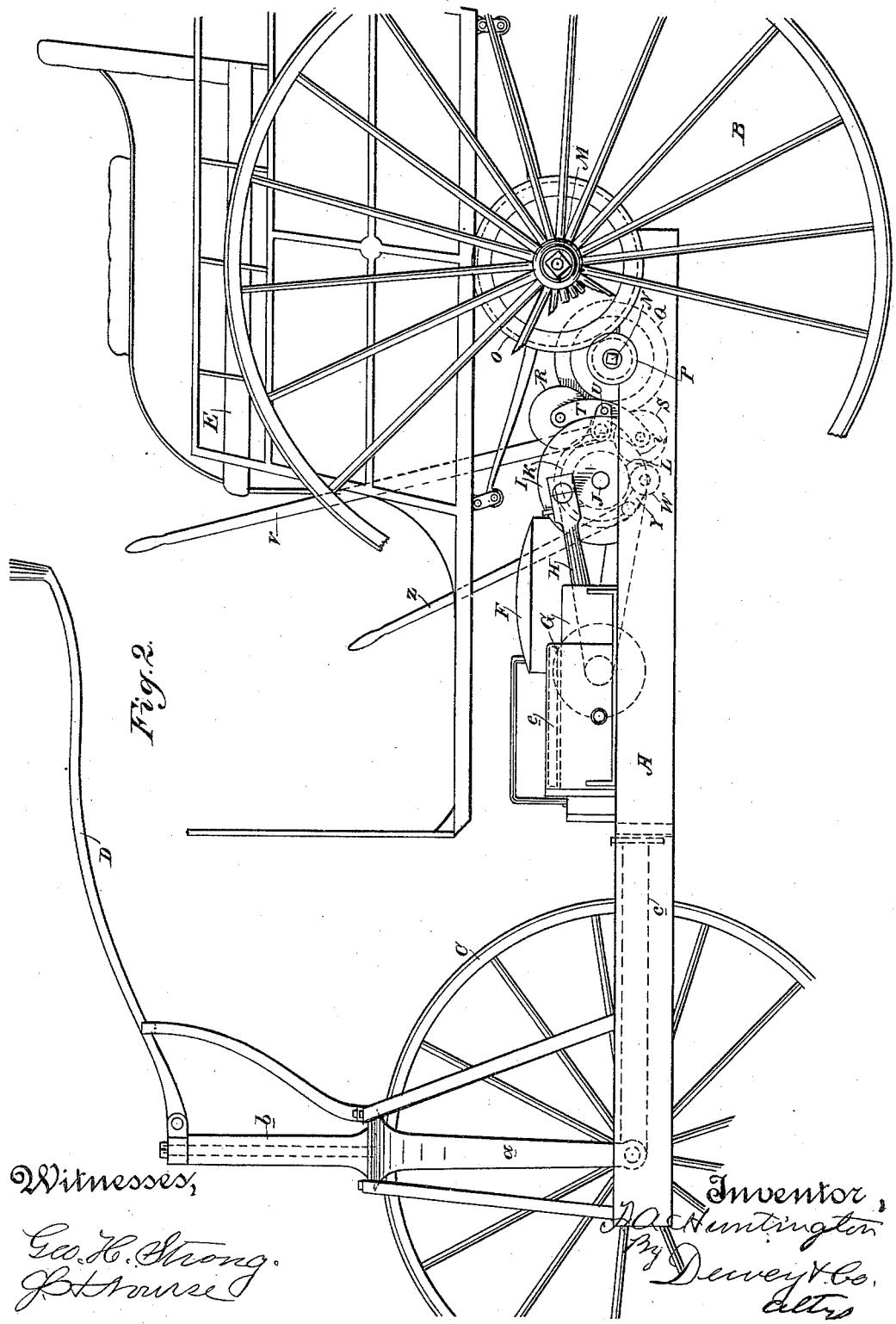

Figure 1 is a plan view of the engine, tank, and gearing. Fig. 2 is a side elevation with a portion of the wheel broken away to show the gearing. Fig. 3 is a detail of speed-changing and backing devices.

This invention is designed to apply a gasoline or other vapor engine to an ordinary carriage or road vehicle, with frictional mechanism for transmitting power, changing the speed of the forward movement of the vehicle and reversing the motion of the vehicle at will.

In the present drawings I have only shown so much of the vehicle as is necessary to indicate the relative position of the parts and show the application of the mechanism.

A is the frame-work of the vehicle, having the rear wheels B, a front steering-wheel C, provided with the handle D, extending to within convenient distance of the operator, who would be seated in the body E of the vehicle.

The body of the vehicle and the engine and driving mechanism will be supported upon the main frame-work A and beneath the body of the vehicle, being operated therefrom by suitable levers, as will be hereinafter described. In the present case I have shown a gas or vapor engine with reciprocating piston and crank-shaft; but a rotary or other form of engine may be substituted, the shaft, which I designate as a "crank-shaft," being in all cases the power or driving shaft.

F is the generator containing the gasoline or other volatile liquid, the vapor of which is employed to drive the piston in the cylinder G.

H is the connecting-rod, through which power is transmitted to the crank-wheel I. The crank-wheel I is mounted upon a shaft J, journaled across the frame of the vehicle, as shown in Fig. 1, and upon this shaft are fixed two friction-wheels K and L, one being somewhat smaller than the other.

M is the shaft or axle upon which the wheels B are fitted, and N is a counter-shaft journaled across the frame A parallel with the axle M. Connected with each of the wheels B (which may run loosely in the usual manner upon a fixed spindle or axle) are the gear-wheels O, and upon the counter-shaft N are corresponding pinions P, through which power is applied to drive the gear-wheels and the bearing-wheels B.

In order to allow the wheels B to turn independently, so that one may move faster than the other when turning corners in either direction, the shaft N is divided and is provided with any suitable form of differential balance-gear which will allow the wheels to be driven simultaneously when power is applied to the exterior of the drum containing this gearing, but which will also allow one wheel to turn faster than the other when necessary. This gearing, which is common and is not therefore described here at length, is contained within the drum Q, to which power is applied to drive the shaft as follows: This drum is made of two different diameters with frictional surfaces, and the two diameters correspond respectively with the diameters of the friction-wheels K and L, but are not in contact with them. In order to produce contacts between the small drum L and the larger portion of Q, which will give a slow rate of speed, or between the larger drum K and the smaller portion of Q, which will produce a more rapid speed, I have mounted two frictional rollers R and S in the frame T, which is curved in the form of a segment, as shown. Just inside the concave portion of this segment and between it and the drums K L is a shaft journaled upon the main frame-work A and carrying crank-arms U. The outer ends of these crank-arms are connected with the segment T, and upon the end of the crank-shaft is a hand-lever V, by which this shaft may be turned. It will now be seen that by placing this shaft and its rollers R and S in a position where the latter will have no contact with the drums K L Q the machine will stand still, although the engine may continue in motion, but by moving the lever V so as to raise the segment the lower drum S will be brought into contact with the smaller frictional wheel L and the larger portion of Q, and motion is thus imparted to the shaft N and through the gears P and O to the bearing-wheels B, giving them the slowest rate of speed.

If it is desired to travel at a high rate of speed, the lever V is moved to depress the roller S and bring the roller R into contact with the drum K and the smaller portion of the drum Q, which increases the speed. It will be manifest that the variations in speed will depend upon the sizes of the drums employed, and that any desired variation may be obtained by properly calculating the diameter of these drums.

When it is desired to back the vehicle, it is done by means of a third frictional drum W, which is secured to the crank-arm Y, fixed upon a shaft which is provided with a lever Z. This lever, which is also in reach of the driver, is movable so as to throw the roller W into contact with the smaller drum L from beneath, and it will press also against the intermediate drum S, thus forcing it against the larger part of Q without contact with the drum L, and by thus introducing the third drum a reversal of the motion takes place and the vehicle will be backed at a slow rate of speed to any desired point.

The steering-wheel C is journaled in the fork a, having a spindle extending up through a vertical stationary sleeve b, and having the handle D or equivalent device by which the wheel is turned. From the lower ends of the fork a, where the wheel-shaft is journaled, a curved guard c extends backward upon each side of the wheel C and its rear portion forms a sort of shoe which travels just inside of and out of contact with the arc d, bolted to the frame A. This arc has a radius corresponding with the vertical axis of motion about which the wheel C is turned, and when the vehicle is progressing ordinarily the shoe or rear portion of the yoke c does not quite touch the inside of the arc d. If, however, the front wheel meets with any considerable obstruction which would tend to force it backward, this shoe will temporarily strike against the arc d, which will thus support the wheel-frame against the arc and prevent strains upon the steering-spindle which might otherwise occur.

The engine which I have shown for driving this apparatus is, as above stated, a gasoline or vapor engine, and in order to keep the cylinder from becoming unduly heated I have arranged a jacket e to surround it, having an inlet-opening upon one side and an outlet-opening upon the other. The inlet-opening is connected by a pipe f with a small air-forcing mechanism or blower g, which is driven by means of a belt h from a pulley i upon the main crank-shaft J. When the vehicle is in motion, a blast of air is thus forced around the cylinder, being discharged through the opening upon the opposite side from the inlet, and this current of air keeps the cylinder sufficiently cool for practical work.

Having thus described my invention, what I claim as new, and desire to secure by Letters Patent, is—

1. The combination, in a vehicle, of the frame, the bearing-wheels upon which it is supported, an engine by which power is transmitted to the engine-shaft, a counter-shaft from which power is transmitted directly through gearing to each of the bearing-wheels independently, said shaft being divided and having a differential driving-gear, and gearing intermediate between the engine-shaft and this shaft, whereby power is transmitted to it, substantially as described.

2. The vehicle having the independently-journaled bearing and driving wheels and a steering wheel or wheels, an engine from which power is transmitted to the driving-shaft, and frictional wheels mounted upon said shaft, a divided counter-shaft with gearing, whereby power is transmitted from it to each of the driving-wheels independently, a frictional drum upon said shaft containing a differential gear, in combination with intermediate movable friction-drums, whereby power may be transmitted from the engine-shaft to the counter-shaft, substantially as described.

3. The vehicle mounted upon independent driving and steering wheels, independent gears by which each of the driving-wheels is propelled, a divided counter-shaft having a frictional drum and a differential gear, whereby the wheels may be driven independently at different rates of speed, in combination with an engine, an engine-shaft provided with a corresponding frictional drum, and a movable frame supporting an intermediate friction-drum between the drums upon the counter-shaft and the engine-shaft, and a lever, whereby said intermediate drum may be turned into or out of contact with the others, substantially as described.

4. The main axle having the independently-journaled bearing and driving wheels of the vehicle, a divided counter-shaft with a differential clutch mechanism and frictional drums of different sizes, and an engine and shaft having corresponding frictional drums of different sizes in plane with those upon the counter-shaft, but out of contact therewith, in combination with an intermediate segmental yoke having drums journaled in it corresponding with the different-sized drums upon the engine and counter shaft, a rocker-shaft and arm by which the movable yoke is suspended, and a lever by which said shaft is moved, so as to throw either of the rollers into contact with the corresponding drums upon the engine-shaft and counter-shaft, whereby the change of speed may be effected, substantially as herein described.

5. The vehicle having independently-driven wheels, a counter-shaft and engine-shaft with friction-wheels, and an intermediate movable yoke, with idler-wheel through which power may be transmitted from the engine-shaft drum to the counter-shaft drum, in combination with a supplemental shaft, rocker-arm and drum, and a lever for moving the same, whereby a reversal of the motion of the vehicle may be effected by throwing this supplemental drum into contact with the driving-wheels, substantially as herein described.

In witness whereof I have hereunto set my hand.

FRANK A. HUNTINGTON.

Witnesses:
S. H. NOURSE,
H. C. LEE.